United States Patent [19]

Kawashima et al.

[11] Patent Number: 5,504,893
[45] Date of Patent: Apr. 2, 1996

[54] DATABASE SYSTEM AND METHOD FOR ACCESSING THE SAME

[75] Inventors: Isao Kawashima; Akira Kurihara, both of Kanagawa, Japan

[73] Assignee: Sony Corporation, Tokyo, Japan

[21] Appl. No.: 469,962

[22] Filed: Jun. 6, 1995

Related U.S. Application Data

[62] Division of Ser. No. 170,104, Dec. 20, 1993.

[30] Foreign Application Priority Data

Dec. 31, 1992 [JP] Japan .................................. 4-360184

[51] Int. Cl.⁶ .................................................. G06F 17/30
[52] U.S. Cl. .............. 395/600; 395/200.06; 395/200.09; 395/200.12; 364/241.8; 364/282.1; 364/284; 364/DIG. 1
[58] Field of Search ...................................... 395/600, 200

[56] References Cited

U.S. PATENT DOCUMENTS

| | | | |
|---|---|---|---|
| 5,276,679 | 1/1994 | McKay et al. ............................ | 370/84 |
| 5,309,511 | 5/1994 | Kotuke .................................... | 379/201 |
| 5,327,554 | 7/1994 | Palazzi, III et al. ..................... | 395/600 |
| 5,379,421 | 1/1995 | Palazzi, III et al. ..................... | 395/600 |
| 5,432,931 | 7/1995 | Woess et al. ............................ | 395/650 |

OTHER PUBLICATIONS

Pate, Laura R. "Trends in Multimedia Applications and the Network Models to Support Them" IEEE GLOBECOM '90, pp. 317–321, 1990.

Acosta Jr., Enrique, "A Personal Computer Prototype to Support ISDN Service Negotiations" 1989 IEEE Int'l Conf. Communications, pp. 38–42, 1989.

Wakid, Shukri A., "Application Profile for ISDN" Proc. IEEE, vol. 79, No. 2, pp. 199–204, Feb. 1991.

*Primary Examiner*—Thomas G. Black
*Assistant Examiner*—Peter Y. Wang
*Attorney, Agent, or Firm*—Lise A. Rode; Jerry A. Miller

[57] ABSTRACT

In a database accessing system, access information concerning access to a database system is transferred using call control messages including user-to-user information within a control procedure defining the connection of a call on a signal channel. This results in a database accessing method that offers the improved use efficiencies of communication lines and the upgraded operating ratio of a database system, and allows users to enjoy reduced communication charges.

7 Claims, 9 Drawing Sheets

DATABASE SYSTEM AND METHOD FOR ACCESSING THE SAME

This application is a division of application Ser. No. 08/170,104, filed Dec. 20, 1993, which is herein incorporated by reference.

BACKGROUND OF THE INVENTION

FIELD OF THE INVENTION

This invention relates to a database system and a method for accessing the same, and more particularly, to a database system and an accessing method which permit a processing for acquiring information from a database to execute efficiently.

DESCRIPTION OF THE RELATED ART

Database accessing has been proposed, in which user-to-user information is used within a call control procedure to transfer information concerning a communication between a database system and a user, so that information can efficiently be acquired from a database system over a communication line.

For the foregoing database accessing, when access to a database system is obtained to acquire desired information, before the desired information is acquired actually, a request for using the database system and an acknowledgment thereof, user's personal identification information and subscriber number, and a designation of requested information and an acknowledgment thereof must be transferred between an user and the database system.

In the past, the above information as well as desired information has not been transferred until a communication channel is established between the user and database system.

A database system accessing method has been proposed as another technique, in which information recording media, in which information is recorded, are changed automatically depending on the frequencies of accessing information recorded in a database system.

In one method of accessing such a database system, information recording media that have large storage capacities though can hardly be rewritten; such as, a compact disc (CD), a magnetic tape, an optical disc are used to record lots of information that is large in quantity per title; such as, music or images.

The above types of information recording media, which are characteristic of long access times, require long waiting times to retrieve intended information and hardly permit multiple access at a time. When a lot of requests are made for specific information, many busy signals or repulse signals are transmitted, or many information recording media are installed to store the same information.

As mentioned above, when an attempt is made to access a database system and acquire desired information, before desired information is acquired actually, a communication channel must have been established first in the past. Thereafter, a request for using the database and an acknowledgment thereof, user's personal identification information and subscriber number, and a designation of requested information and an acknowledgment thereof are transferred over the communication channel.

After a communication channel is established, before desired information is transferred actually, some time has elapsed in the past. A manager of a database system suffers from a drawback of a deteriorated operating ratio of a database system. Users are annoyed about a drawback of increasing communication charges.

SUMMARY OF THE INVENTION

In view of the foregoing, an object of this invention is to provide a database accessing method based on the fact that Integrated Service Digital Network (ISDN) has a communication procedure for transferring user-to-user information which is applicable to end-to-end communication. Specifically, before a call control message including user-to-user information is used to establish an information channel, over which desired information is transferred, between an user and a database system, a control procedure describing the connection of a call on a signal channel is developed to transfer a set of information; such as, a request for using the database system and an acknowledgment thereof, user's personal identification information and subscriber number, and a designation of requested information and an acknowledgment thereof. This results in the improved operating ratio of the database system, enabling users to enjoy reduced communication charges.

As described above, if a long waiting time is required to retrieve intended information, much communication time is wasted. When a lot of requests are made for certain information, if many busy signals are sent, users cannot enjoy the presence of affluent communication lines and the quick acquisition of intended information.

Supposing a database system were constructed using numerous information recording media, which store the same information, in an effort to solve the above problem, the database system would not be advantageous in terms of economy.

Another object of this invention is to provide a database system accessing method that offers improved efficiency in using a database system and thus to improve the use efficiency Of a database system. Specifically, a certain number of semiconductor memories or hard discs, each of which offers a much shorter access time than the CD, magnetic tape, or optical disc and is quickly rewritable, as well as ISDN lines are used to develop a control procedure describing call connection within which user-desired information specified as user-to-user information is grasped. Thus, while desired information is being transmitted to a user, information recording media are changed automatically depending on the cumulative numbers of requests made by users that are counted title by title.

The foregoing objects and other objects of this invention have been achieved by the provision of a database accessing method in a database access mode for a communication network in which a Call Setup message, an Accessed message, an Acknowledge message, or a Clear message can be transferred according to a call control procedure, comprising: a step at which an user terminal transmits a Call Setup message in which access information concerning user's access to a database is specified as user-to-user information; a step at which a database system receives the Call Setup message and extracts the user-to-user information; a step at which the database system transmits an Accessed message, in which the fact that the database System has received the access information concerning user's access to a database is specified as user-to-user information; a step at which the database system interprets the user-to-user information in the Call Setup message and determines whether the user has the intention of using the database system and the user's personal identification information is valid, and what is the designation of requested information; a step at which when determining that a set of information sent from the user does not represent a database system use request, that the user's personal identification information is invalid, that the designation of requested information is inconsistent, or that the requested information is unfond, the database system transmits a Clear message; a step at which when determining that the set of user information sent from the user represents a database system user request, that the user's personal identification information is valid, and that the designation of requested information is consistent, the database system transmits an Acknowledge message in which a request for asking an user to stand by in order to receive information is specified as user-to-user information; a step at which the user terminal determines whether a message succeeding the Accessed message is a Clear message or an Acknowledge message; a step at which when determining at the determining step that the succeeding message is a Clear message, the user terminal receives and interprets the Clear message; a step at which when determining at the determining step that the succeeding message is an Acknowledge message, the user terminal receives the Acknowledge message, interprets the user-to-user information, and then establishes a communication channel; a step at which the database system transmits requested information over the established communication channel; a step at which the user terminal receives the desired information from the database system; a step at which the database system transmits a Clear message in which information concerning information sources accommodated by the database system is specified as user-to-user information; and a step at which the user terminal receives the Clear message.

Further, a database accessing method in a database access mode for the communication network, comprising: a step succeeding the step at which an user information transmits a Call Setup message in which access information concerning user's access to a database is specified as user-to-user information, at which a database system receives the Call Setup message and extracts the user-to-user information; a step succeeding the step of extracting the user-to-user information, at which the database system transmits an Accessed message in which the fact that the database system has received the access information concerning user's access to a database is specified as user-to-user information; a step succeeding the step of extracting the user-to-user information, at which the database system interprets the user-to-user information in the Call Setup message, and determines whether the user has the intention of using the database system and the user's personal identification information is valid, and what is the designation of requested information; a step succeeding the determining step, at which when determining that a set of information sent from the user does not represent a database system user request, that the user's personal identification information is invalid, that the designation of requested information is inconsistent, or that the requested information is unfond, the database system transmits a Clear message; a step succeeding the determining step, at which when determining that the set of information sent from the user represents a database system use request, that the user's personal identification information is valid, and the designation of requested information is consistent, the database system transmits an Acknowledge message in which a request for asking the user to stand by in order to receive information is specified as the user-to-user information; a step succeeding the step at which the database system transmits an Accessed message, at which the user terminal receives the Accessed message; a step succeeding the step of receiving the Accessed message, at which the user terminal determines whether the message is a Clear message or an Acknowledge message; a step succeeding the determining step, at which when determining at the determining step that the message is a Clear message, the user terminal receives and interprets the Clear message; a step succeeding the determining step, at which when determining at the determining step that the message is an Acknowledge message, the user terminal receives the Acknowledge message, interprets the user-to-user information, and then establishes a communication channel; a step succeeding the step of establishing a communication channel, at which the database system transmits requested information over the established communication channel; a step succeeding the step of transmitting information over the communication channel, at which the user terminal receives the desired information from the database system; a step succeeding the step of receiving the information, at which the database system transmits a Clear message in which information concerning information sources accommodated by the database system is specified as user-to-user information; and a step succeeding the step of transmitting the Clear message, at which the user terminal receives the Clear message.

Further, user's intention of using the database system, user's personal identification information such as an attribute and a subscriber number, and information of a designation of requested information are used as access information concerning user's access to a database.

Further, after interpreting the user-to-user information in a Call Setup message and determining whether the user has the intention of using the database system and the user's personal identification information is valid, when finding that a database system user request is not issued or that the user's personal identification information is invalid, the database system transmits a Clear message in which the fact that access to the database system is illegal is specified as user-to-user information.

Further, after interpreting the user-to-user information in a Call Setup message and determining what is the designation of requested information for which the database system is to be used, when finding that the designation of requested information is inconsistent, the database system transmits a Clear message in which the fact is specified as user-to-user information.

Further, information concerning announcement of new products, access method for accessing the new products, and a charge list are used as the information concerning information sources accommodated by the database system that after information requested by an user is transmitted over the communication channel, is specified as user-to-user information in a Clear message.

Further, a communication network employed is conformable to ISDN.

To solve the aforesaid problems, this invention in the second mode provides a database system comprising: a plurality of types of information recording media that can be assigned priority levels before information sources to be supplied to users are recorded therein; a means that accumulates and stores the numbers of requests made by users in one-to-one correspondence with information sources; a means for recording the number of requests for at least an information source that ranks lowest in terms of the number of requests among those recorded in each of information recording media assigned high priority levels; a means for changing an information recording medium, in which an information source is to be recorded, according to the number of requests made by users; a network connection control means capable of receiving an information source requested by an user within a control procedure describing call connecting; and a communication channel over which the information source requested by an user is transmitted to the user.

Further, the database system includes a comparing means for comparing the cumulative value of the number of requests for an information source requested by an user with the cumulative value of the number of requests for an information source that ranks lowest in terms of the number of requests among those recorded in an information recording medium.

Further, the database system includes a means for setting an initial value of the number of requests for each information source.

Further, the database system includes a means for recording in which information recording media information sources are recorded.

Further, the database system includes a display means capable of displaying the numbers of requests for respective information sources and a listing of the information sources recorded in information recording media.

Further, an ISDN call control procedure can be employed.

Further, an accessing method for a database system including at least a plurality of types of information recording media, a network connection control means capable of receiving an information source requested by an user within a control procedure describing call connection, and a communication channel over which the information source requested by an user is transmitted to the user, comprising: a step at which when a call terminates, a Call Setup message including user-to-user information is received and an information source requested by an user is extracted from the user-to-user information; a step succeeding the step of extracting an information source, at which an information recording medium in which the information source is recorded is identified; a step at which the information source requested by the user is fetched from the information recording medium and transmitted to a communication network over the communication channel; and a step at which the information recording medium in which the information source is recorded is changed according to the number of requests for the information source requested by the user.

Further, an accessing method for a database system including at least a plurality of types of information recording media that can be assigned priority levels before information sources to be supplied to users are recorded therein, a means that accumulates and stores the numbers of requests made by users fin one-to-one correspondence with information sources, a means for recording the number of requests at least for an information source that ranks lowest in terms of the number of requests among those recorded in each of information recording media assigned high priority levels, and a communication channel over which an information source requested by an user is transmitted to the user, comprising: a step of identifying an information recording medium in which an information source requested by an user is recorded; a step of fetching the information source requested by an user from the information recording medium and transmitting it to a communication network over the communication channel; a step at which when an information recording medium in which the information source requested by an user is recorded has the highest priority level, a cumulative value of the number of requests for the information source requested by the user is incremented by one; a step at which when the information recording medium in which the information source requested by an user has any of the second highest to second lowest priority levels, the cumulative value of the number of requests for the information source requested by the user is incremented by one; a step at which a cumulative value of the number of requests for an information source, which ranks lowest in terms of the number of requests among those recorded in an information recording medium whose priority level is higher by one level than that of the information recording medium in which the information source requested by the user is recorded, is compared with the number of requests for the information source requested by the user; a step at which when the number of requests for the information source requested by an user exceeds the cumulative value of the number of requests for the information source that ranks lowest in terms of the number of requests among those recorded in the information recording medium whose priority level is higher by one level than that of the information source requested by the user, the information source that ranks lowest in terms of the number of requests among those recorded in the information recording medium whose priority level is one-level higher is replaced with the information source requested by the user; a step at which when the information recording medium in which the information source requested by the user is recorded has the lowest priority level, a cumulative value of the number of requests for the information source requested by the user is incremented by one; a step at which the cumulative value of the number of requests for an information source, which ranks lowest in terms of the number of requests among those recorded in an information recording medium whose priority level is higher by one level than that of the information recording medium that ranks lowest in terms of a priority level an in which the information source requested by the user is recorded, is compared with the number of requests for the information source requested by the user; and a step at which when the number of requests for the information source requested by the user exceeds the cumulative value of the number of requests for the information source that ranks lowest in terms of the number of requests among those recorded in the information recording medium whose priority level is higher by one level, the information source requested by the user is transcribed to the information recording medium whose priority level is higher by one level, and the information source that ranks lowest in terms of the number of requests is deleted from the information recording medium whose priority level is higher by one level.

When originating a call, an user of a database system uses a signal channel to transmit a Call Setup message in which a set of access information concerning access to the database system; such as, a request for using the database system, user's personal identification information, and a designation of requested information is specified as user-to-user information.

When receiving the Call Setup message over the signal channel, the database system extracts the user-to-user information from the Call Setup message. The database system then transmits an Accessed message, which describes that the database system is in a call-terminated and accessed state (at this time, the signal channel for user in transmitting call control signals has been connected but an information channel for use in transferring information has not been connected), to the user.

The database system interprets the user-to-user information included in the Call Setup message and determines whether a database system user request is issued and the user's personal identification information is valid, and what is the destination of requested information.

When no database system user request is issued, the user's personal identification information is invalid, the destination of requested information is inconsistent, or the requested information is unfond, no communication channel is established but a Clear message is transmitted immediately. The database system then passes control to a clear procedure.

After interpreting the user-to-user information, when determining that a database system use request is issued, the user's personal identification information is valid, and the destination of requested information is consistent, the database system establishes a communication channel and transmits an Acknowledge message in order to transmit the designated information.

At this time, in the Acknowledge message, a message describing that the information sent from an user of the database system has been accepted and a request for asking the user to stand by in order to receive information are specified as user-to-user information.

In response to the Acknowledge message, the user makes preparations for receiving the desired information, returns an acknowledgment, and establishes a communication channel.

Thereafter, the database system transmits the requested information over the established communication channel. The user receives the desired information from the database system. When the information transfer is completed, control is passed to the clear procedure. The communication thus terminates.

Information recording media are divided into three types: one types of information recording media (hereinafter, type-1 information recording media) are hardly rewritable and require long access times but have large storage capacities, including a CD, a magnetic tape, and an optical disc; another type of information recording media (hereinafter, type-2 information recording media) are readily rewritable, require short access times, and have relatively large storage capacities, including a hard disc; and yet another type of information recording media (hereinafter, type-3 information recording media) are readily rewritable and require very short access times but have relatively small storage capacities, including a RAM and a flash memory.

Among the information recording media of three types, data in a type-1 medium can be copied into a type-2 or type-3 medium, data in a type-2 medium can be transcribed to a type-3 medium, and data in a type-3 medium can be transcribed to a type-2 medium.

Herein, "copying" means that information is duplicated with the source information left retained, while "transcribing" means that information is duplicated with the source information deleted.

Initially, information is recorded in a type-1 information recording medium. On the assumption of the number of requests made by users, necessary information is copied from the type-1 information recording medium to type-2 and type-3 information recording media.

When an information recording medium is in use, the number of requests made by users is counted information by information. When the count exceeds a specific value, the information in a type-1 medium is copied into a type-2 medium, and the information in a type-2 medium is transcribed to a type-3 medium. When the count becomes lower than another specific value, the information in a type-3 medium is transcribed to a type-2 medium, and the information in a type-2 medium is deleted.

Owing to the foregoing operation, information recording media, which have different storage capacities and require different access times, can be used selectively according to the numbers of requests made by users. Furthermore, information that has frequently been requested by users can be supplied for a short access time, and thus multiple information recording media can be utilized efficiently.

According to the database accessing method of this invention, before an user receives desired information from a database system over an information channel, the user and database system can transfer within a call control procedure a request for using the database system and an acknowledgment, user's personal identification information, and a designation of requested information and an acknowledgment.

Accordingly, communication over the information channel can be dedicated to transfer of desired information in practice. A manager of the database system can benefit by the improved use efficiencies of communication lines and the upgraded operating ratio of the database system. Users will enjoy the reduced communication charges.

Using the database accessing method according to this invention, information recording media, which have different storage capacities and require different access times, can be used selectively according to the numbers of requests made by users. The selective use can be achieved automatically but will not disturb an operator of the database system. Furthermore, information that has frequently been requested by users can be accessed for a short access time, and thus multiple information recording media can be utilized efficiently.

The states of records in the respective information recording media, which vary at every time an user makes a request, can be grasped.

A request made by an user is received not after a communication channel is reserved but within an ISDN call control procedure. This results in the improved use efficiencies of communication lines and the upgraded operating ratio of the database system. Users can enjoy the reduced communication charges.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) First Embodiment

Figures 1, 2:
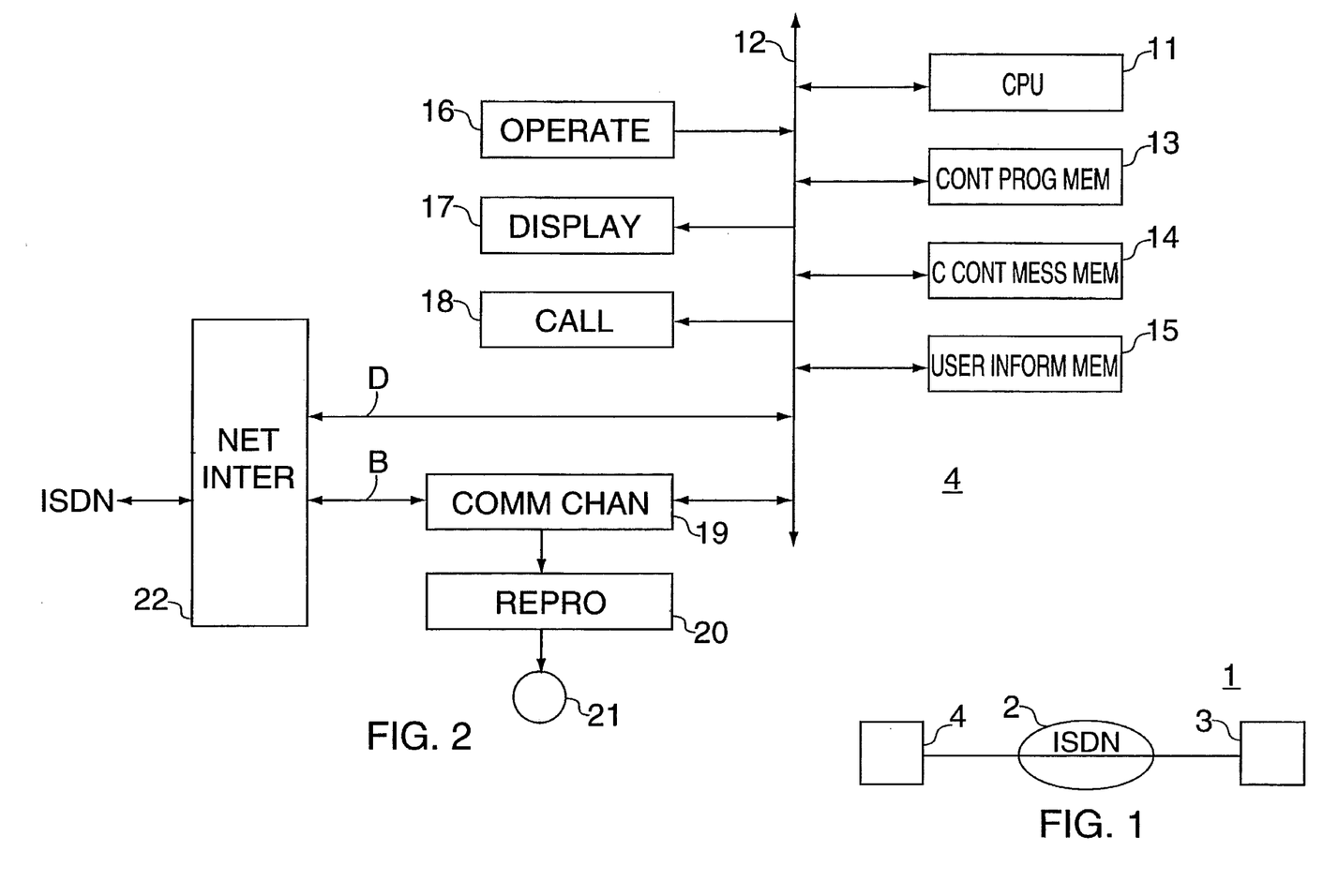
FIG. 1 is a block diagram showing the first embodiment of a message communication system according to this invention.
FIG. 2 is a block diagram showing an example of an user terminal according to this invention.

In FIG. 1, 1 shows a communication system that permits the communication between a database system 3 and an user terminal 4 via a communication network 2; such as, an ISDN network. Based on a database accessing method according to this invention, before an information channel is established, a signal channel in the communication network 2 is used to transfer a set of information; such as, a request for using the database 3 system 3 and an acknowledgment thereof, user's personal identification information, and a designation of requested information and an acknowledgment between the user terminal 4 and a database system 3.

The user terminal 4 comprises a transmitting means for transmitting messages for controlling a call on the signal channel which are composed of such as, a Call Setup message, an Accessed message, an Acknowledge message, a Clear message, a Release message, and a Release Completed message, a receiving means, and a communicating means using a communication channel formed with an information channel.

The database system 3 comprises a transmitting means for transmitting messages for controlling a call on a signal channel which are composed of such as, a Call Setup message, an Accessed message, an Acknowledge message, a Clear message, a Release message, and a Release Completed message, a receiving means, and a communicating means using a communication channel formed with an information channel, a storage means for storing information, and an access means for accessing information.

In this embodiment, the user terminal 4 consists of, as shown in FIG. 2: a CPU 11 for executing control programs; a system bus 12 over which the CPU 11 is allowed to transmit data and that consists of a data bus, an address bus, and a control bus; a control program memory 13 that contains control programs and is formed with a ROM; a call control message memory 14 that contains messages for controlling an outgoing call and is formed with a RAM; an user information memory 15 that is formed with a RAM and that stores information concerning user's access to the database system, that is, a set of information including a database system user request, user's personal identification information, and a designation of requested information, which is specified as user-to-user information in a Call Setup message, and that also stores information specified as user-to-user information in a Clear message and sent from the database system; an operation unit 16 for use in dialing or creating user information; a display unit 17 for displaying information sent from the database system and user information; a calling unit 18 that generates ring tones at the time of call termination; a communication channel 19 that is an information channel; a reproducing unit 20 activated when information to be acquired is music; a loudspeaker 21; and an interface 22 for providing the interface with an ISDN network.

The ISDN network 2 provides the user terminal 4 with a signal channel D for use in transferring call control signals such as a Call Setup message, an Accessed message, an Acknowledge message, and a Clear message at the time of call origination or termination, and an information channel B for use in end-to-end information transmission.

User-to-user information, which is usable for data transfer between the user terminal 4 and the database system 3, is included as one information element in each of the Call Setup message, Accessed message, Acknowledge message, and Clear message.

The network interface 22 separates or units the signal channel D and information channel B, which are provided by the ISDN network, and transfers call control signals to or from the CPU 1 over the channel D. The network interface 22 also transfers end-to-end information to or from the communication channel 19 through the channel B.

The CPU 11 executes programs existent in the control program memory 13 and transfers call control signals to or from the network interface 19 over the system bus 12. The CPU 11 also controls all the operations of the user terminal 4.

Figure 3:
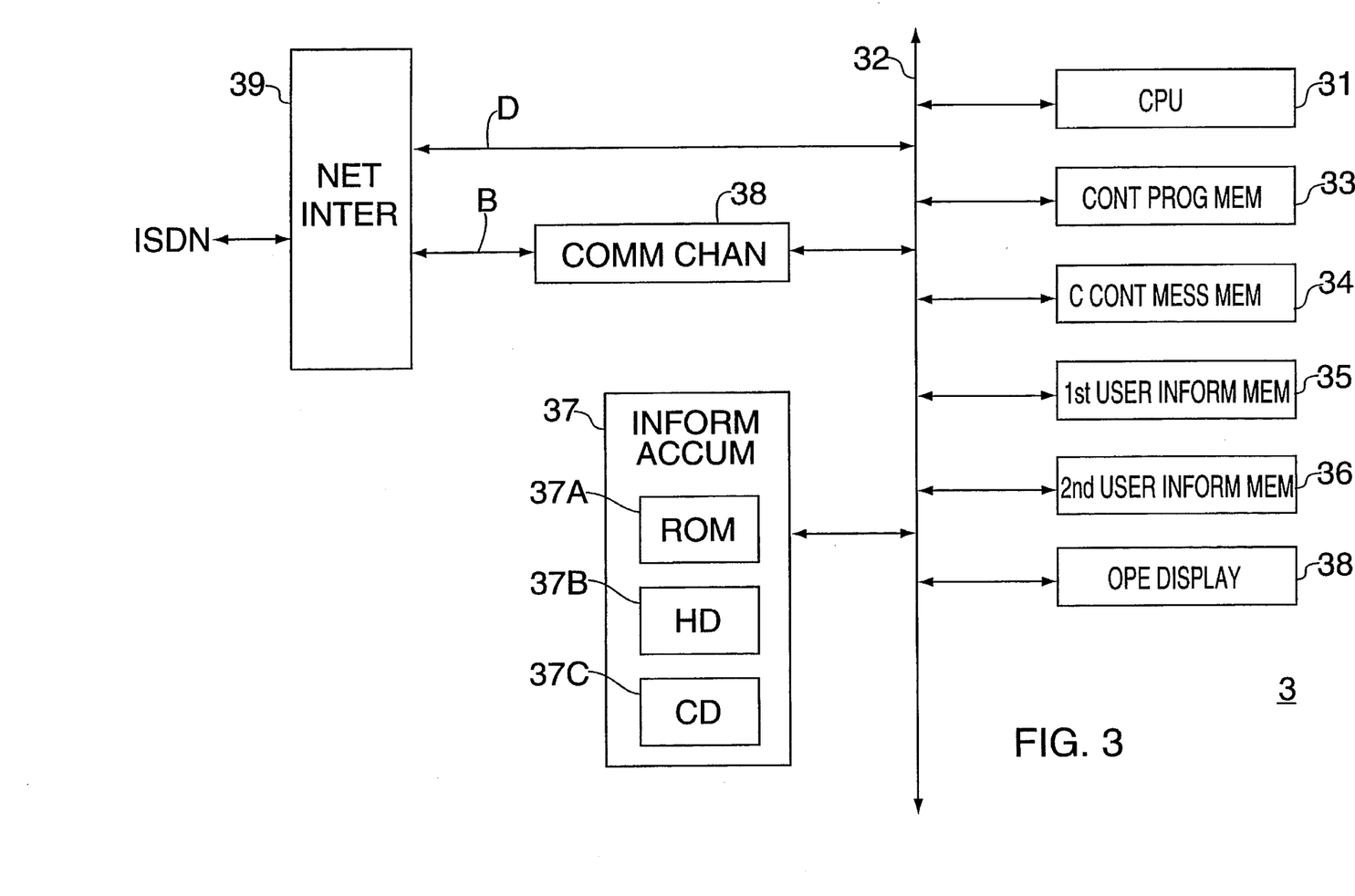
FIG. 3 is a block diagram showing an example of a database system according to this invention.

The database system 3 in this embodiment consists of, as shown in FIG. 3: a CPU 31 for executing control programs; a system bus 32 that consists of a data bus, an address bus, and a control bus and over which the CPU 11 is allowed to transmit data; a control program memory 33 that contains control programs and is formed with a ROM; a call control message memory 34 that contains messages for controlling an outgoing call and is formed with a RAM; an user information memory 35 that stores information specified as user-to-user information in each call control message and sent to an use, and information specified as user-to-user information in each call control message and sent from an user to the database system 3, that is, a set of information including an user request for using the database system 3, user's personal identification information and subscriber number, and a designation of requested information, and that is formed with a ROM; a second user information memory 36 that stores various information concerning an user, such as, user's personal identification information and subscriber number; an information accumulator 37 in which information sources to be supplied to users are contained in a semiconductor memory such as a ROM 37A, a hard disc 37B, and an optical memory such as a compact disc 37C; an operation display unit 38 for use in specifying communication control or creating management data for managing information to be stored in the information accumulator 37; a communication channel 10 that is an information channel for use in transmitting the information sources existent in the information accumulator 39 to the ISDN network; and a network interface 39 for providing the interface with the ISDN network.

The information sources stored in the information accumulator 37 include music sources, and text information and Jacket image information concerning the artists.

Figure 4:
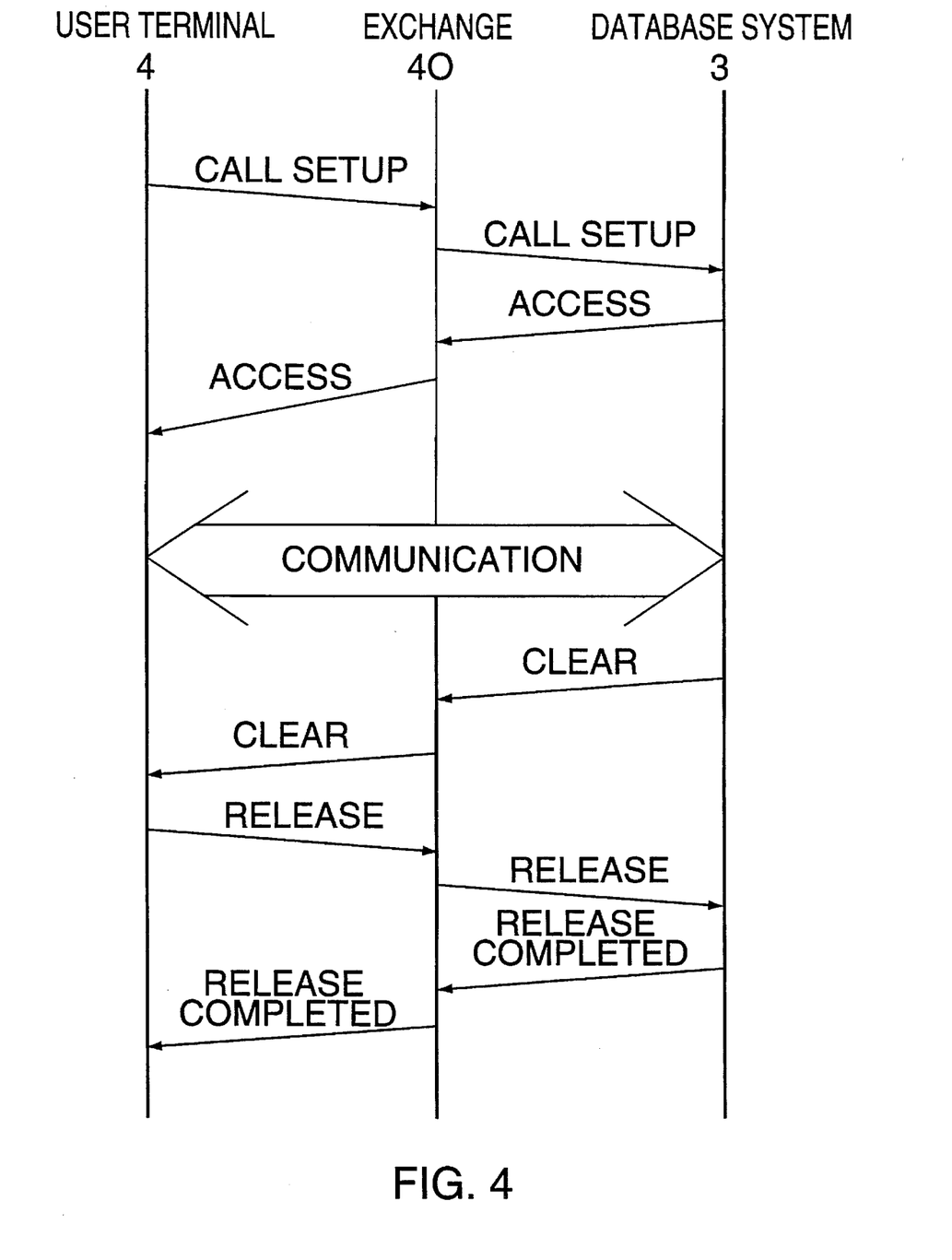
FIG. 4 is a flow chart showing a connection control procedure defining the connection between an user terminal and a database system according to this invention.
Figure 5:
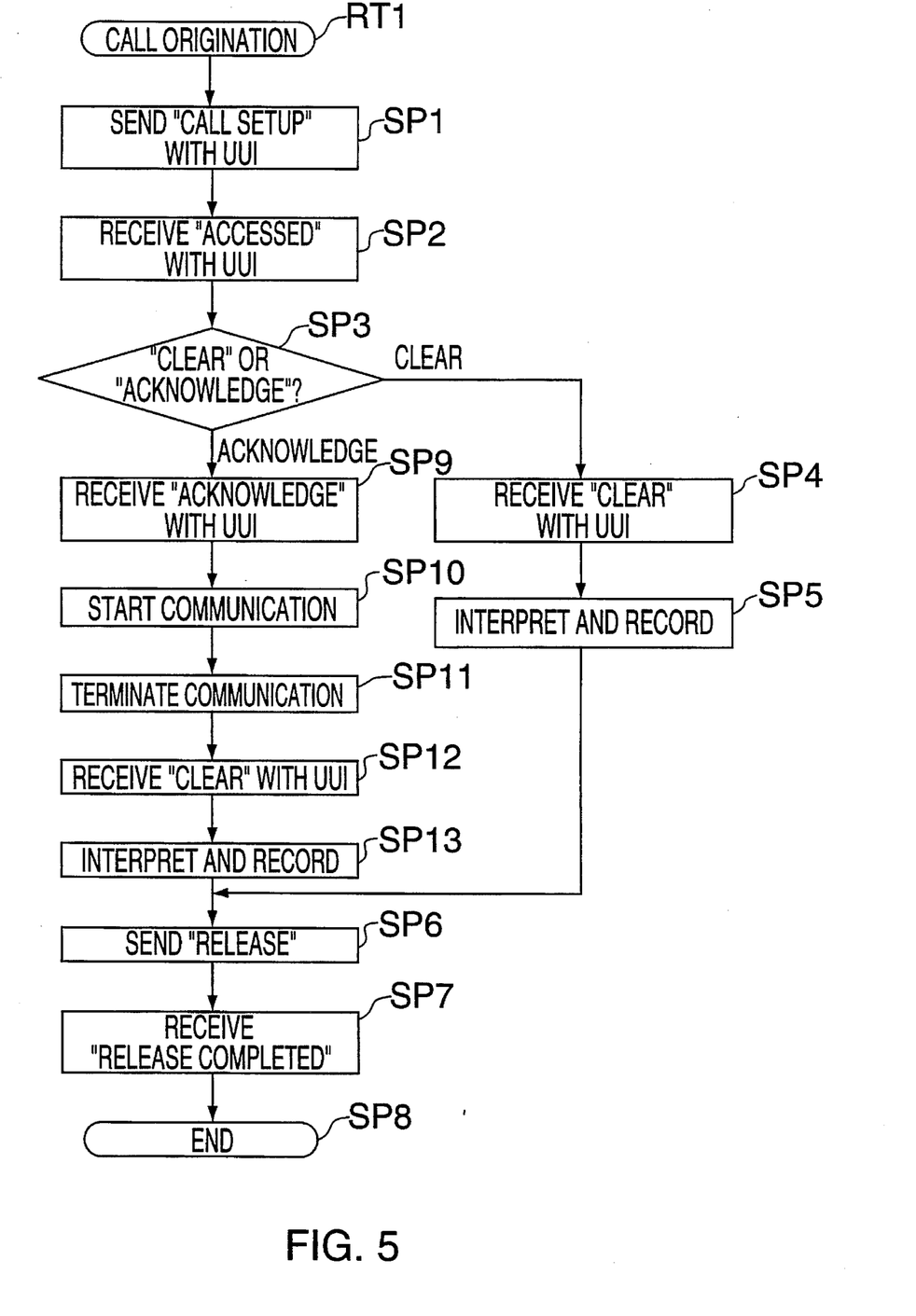
FIG. 5 is a flow chart showing a control procedure implemented in an user terminal according to this invention.
Figure 6:
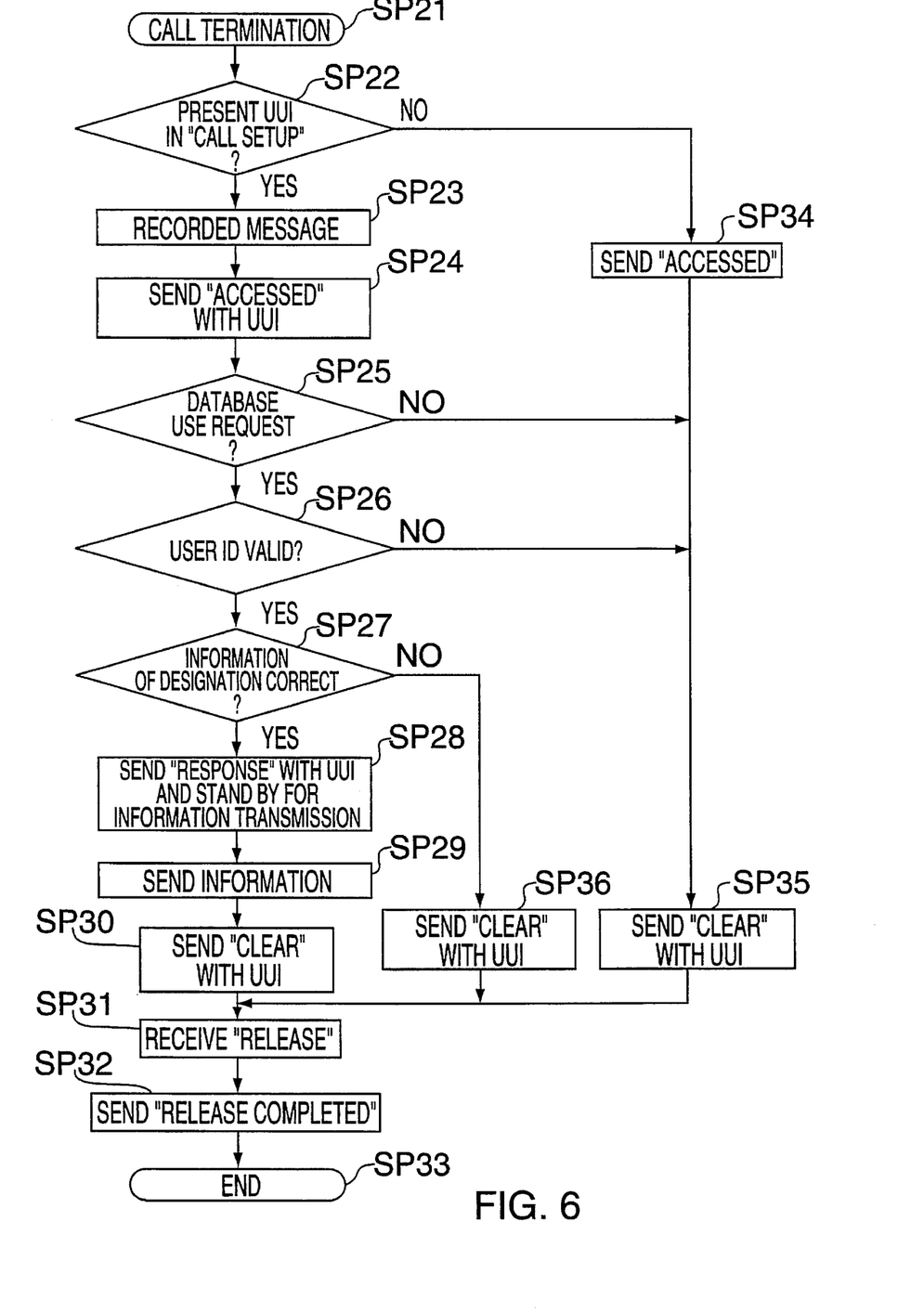
FIG. 6 is a flow chart showing a control procedure implemented in a database system according to this invention.

Next, the operations of the user terminal 4 and database system 3, which are carried out before an user acquires desired information from the database system and on the basis of a database accessing method according to this invention will be described with reference to FIG. 4 showing a connection control procedure that describes connection control among the user terminal 4, an exchange 40, and the database system 3. FIGS. 5 and 6 are flowcharts showing the control procedures for the user terminal 4 and database system 3.

FIG. 4 shows the connection control procedure based on a database accessing method that describes connection control among the user terminal 4, exchange 40, and database system 3.

(a1) When originating a call, the user terminal transmits a Call Setup message, in which a set of information including an user's request for using the database system 3, user's personal identification information and subscriber number, and a designation of requested information is specified as user-to-user information.

(b1) When receiving the Call Setup message at the time of call termination, the database system 3 extracts the user-to-user information from the Call Setup message. The database system 3 then transmits an Accessed message, in which the fact that the database system 3 has received access information concerning user's access to a database is specified as user-to-user information, and thus indicates that the database system 3 is in the call terminated and accessed state.

(c1) The database system 3 interprets the user-to-user information in the Call Setup message, and determines whether an use request is issued for the database system 3 and the user's personal identification information is valid, and what is the designation of requested information.

(d1) When determining that the set of information sent from the user does not represent an use request for the database system 3, the user's personal identification information is invalid, the designation of requested information is inconsistent, or the requested information is unfond, the database system 3 does not follow a process of transmitting an Acknowledge message and establishing a communication channel, but transmits a Clear message immediately and passes control to the clear procedure.

(e1) When determining that the set of information sent from the user represents an use request for the database system 3, the user's personal identification information is valid, and the designation of requested information is consistent, the database system 3 transmits an Acknowledge message so that a communication channel will be established and designated information will be transmitted.

In the Acknowledge message, a request for asking the user to stand by in order to receive information is specified as user-to-user information.

(f1) When receiving the Accessed message and then the Clear message, the user terminal 4 passes control to the clear procedure and terminates the communication. In the Clear message sent from the database system 3, the information saying that the access method for accessing the database system 3 is illegal may be specified as user-to-user information and supplied to the user.

(g1) When receiving the Accessed message and then the Acknowledge message, the user terminal 4 makes preparations for receiving desired information from the database system 3 and establishes a communication channel.

(h1) The database system 3 transmits requested information over the established communication channel. The user receives the desired information from the database system 3.

(j1) When completing information transfer, the database system 3 passes control to the clear procedure and terminates the communication. In the Clear message sent from the database system 3, the information concerning information sources accommodated by the database system 3 may be specified as user-to-user information and supplied to an user.

As mentioned above, in the database accessing method according to this invention, user-to-user information included in a Call Setup message is interpreted to determine whether an user request is issued for the database system 3 and user's personal identification information is valid, and what is the designation of requested information. Based on the result of the determination, communication is carried out according to a normal ISDN connection control protocol, or alternatively, the process of transmitting an Acknowledge message and establishing a communication channel is not followed, but a Clear message is transmitted immediately and control is passed to the clear procedure.

The CPU 11 is the user terminal 4 executes an user terminal control procedure according to the flow chart of FIG. 5.

When a call is originated at a step SP1, the CPU 11 fetches access information concerning user's access to the database system 3; that is, a set of information including such as an use request for the database system 3, user's personal identification information, and a designation of requested information, which has been stored in the user information memory 15 at a step SP1 in FIG. 5 and will be specified as user-to-user information (UUI) in a Call Setup message and the supplied, specifies the fetched information as user-to-user information in a Call Setup message existent in the call control message memory 14, and then transmits the Call Setup message to the database system 3 over the channel D of the ISDN network via the network interface 22. At a step SP2, the CPU 11 receives an Accessed message as a reply to the Call Setup message over the channel D of the ISDN network.

At a step SP3, the CPU 11 checks if the Accessed message is succeeded by an Acknowledge message meaning that the database system 3 assents to an user's request, or a Clear message meaning that the database system 3 dissents from an user's request.

When the Accessed message is succeeded by a Clear message, the CPU 11 receives the Clear message, in which a reason why the database system 3 dissents from the user's request is'specified as user-to-user information, at a step SP4, and interprets and records the user-to-user information at a step SP5. After performing the processing of steps SP6 and SP7, the CPU 11 completes the clear procedure at a step SP8.

When it is found at the step SP3 that the Accessed message is succeeded by an Acknowledge message meaning that the database system 3 assents to the user's request, the CPU 11 receives the Acknowledge message, in which an instruction saying that the user terminal should stand by to receive information from the database system 3 is specified as user-to-user information, at a step SP9, connects the information channel at a step SP10, and then starts communication with the database system 3.

The CPU 11 terminates the communication with the database system 3 at a step SP11, and receives a Clear message, in which the information concerning information sources accommodated by the database system 3 is specified as user-to-user information, at a step SP12.

At a step SP13, the CPU 11 interprets and records the user-to-user information and completes the clear procedure starting at the step SP6.

The operation of the database system 3 will be described in conjunction with FIG. 6.

When receiving a Call Setup message as an incoming call sent from the user terminal 4 over the channel D of the ISDN network, the network interface 39 in the database system 3 allows a control means to transfer the Call Setup message to the CPU 31 at a step SP21. In response to the Call Setup message, the CPU 31 checks for the presence of user-to-user information at a step SP22 in FIG. 6.

When user-to-user information is present, the user-to-user information is stored in an area of the first user information memory 35, in which user-to-user information included in a Call Setup message received at the time of call termination is supposed to be stored, at the step SP23. The CPU 31 then sends an Accessed message, in which the fact that the information has been received from the user is specified as user-to-user information, at a step SP24.

At a step SP25, the CPU 31 determines whether the user has the intention of using a database. When determining that the user has intention, the CPU 31 compares at a step SP25 the user information stored in the first user information memory 35 with the user information existent in the second user information memory 36, and thus determines whether the user's personal identification information is valid. If the user's personal identification information is valid, information requested by the user is collated with the information list in the information accumulator 37, and thus it is determined whether the information requested by the user is consistent. If the information requested by the user is consistent, the CPU 31 proceeds to a step SP28. At the step SP28, the CPU 31 transmits an Acknowledge message, in which the fact that the information requested by the user is about to be sent over the information channel 37 is specified as user-to-user information, and places the information accumulator 15 in the standby state so as to send the desired information over the information channel.

At a step SP29, the information channel is closed so that the desired information will be sent from the information accumulator 37. The information accumulator 37 has information sources to be supplied to users contained in storage media including a semiconductor memory such as a ROM, a hard disc, and an optical memory such as a compact disc CD, and changes the storage media according to the use frequencies of the information sources.

When completing information transmission, the CPU 31 transmits a Clear message existent in the call control message memory 34 at a step SP30. An information guide concerning the stored information is specified as user-to-user information in the Clear message.

At a step SP31, the CPU 31 receives a Release message from the user terminal 4, transmits a Release Completed message to the user terminal 4 at a step SP37, and then terminates a sequence of connection control operations.

If it is found at the step SP22 that user-to-user information is not included in the Call Setup message, an Accessed message not including user-to-user information is transmitted at a step SP33. An Accessed message is transmitted at a step SP34. The CPU 31 then proceeds to the connection completion procedure of steps SP31 and SP32 through a step 35 at which a Clear message is transmitted.

When determining at the step SP25 that the user has no intention of using the database system 3, or when determining at the step SP26 that the user's personal identification information is invalid, the CPU 31 proceeds to the connection completion procedure of the steps SP31 and SP32 through the step 35.

When determining at the step SP27 that the information requested by the user is inconsistent, the CPU 31 transmits a Clear message, in which the fact that the information requested by the user is inconsistent is specified as user-to-user information, at a step SP36, and proceeds to the connection completion procedure of the steps SP31 and SP32.

As mentioned above, using the database accessing method of this embodiment, an user and the database system 3 can transfer various messages in addition to those presented in this embodiment. For example, when the information stored in the database system is music information, the service of answering inquiries about guide information concerning new musical notes and announcing new musical notes can be realized within an ISDN call control procedure without a special communication control procedure.

(2) Second Embodiment

Figure 7:
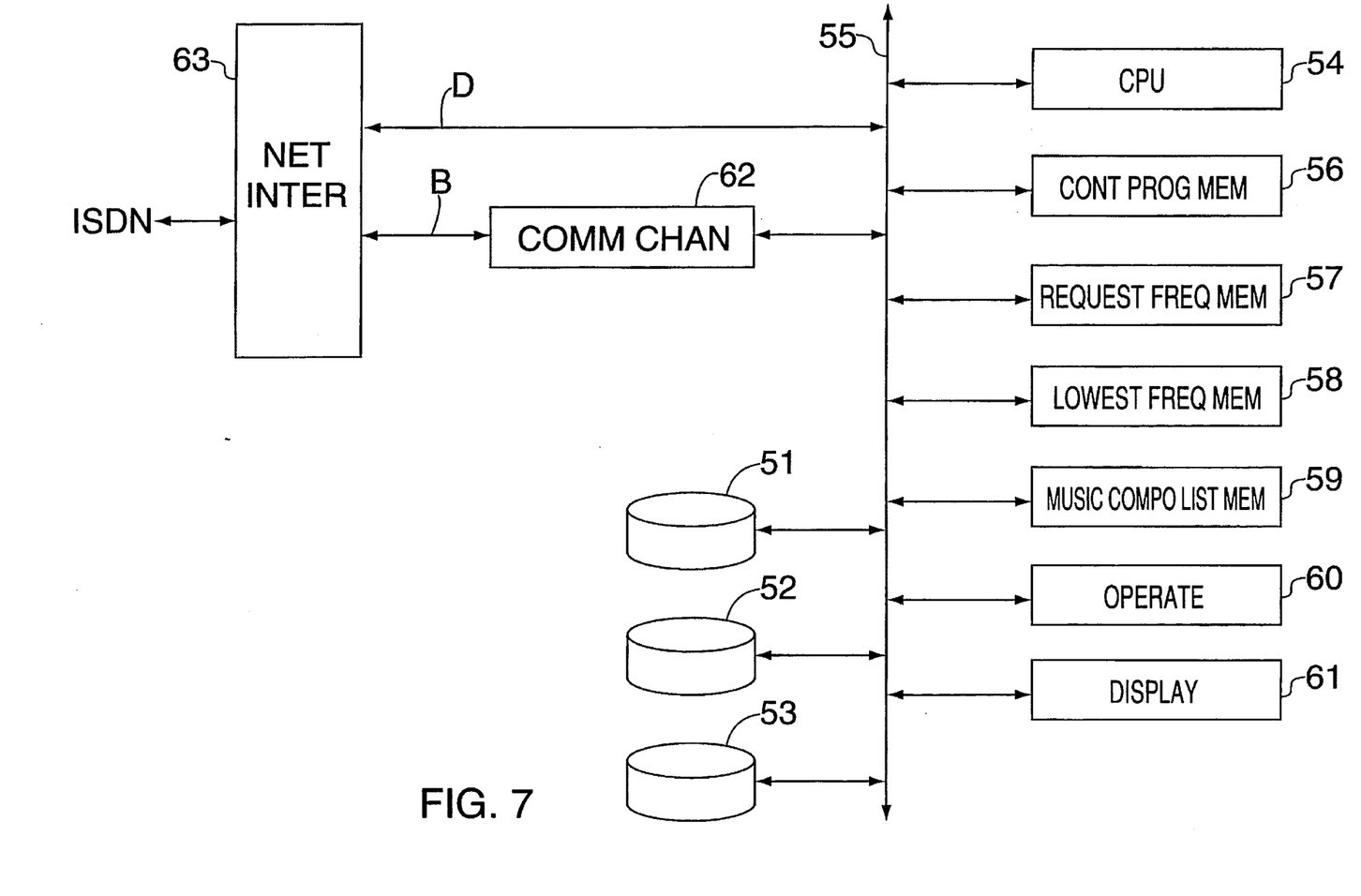
FIG. 7 is a block diagram showing the second embodiment of a database system according to this invention.

FIG. 7 shows the second embodiment of this invention. The second embodiment represents an example of a configuration of database system dedicated to music software that is based on a database system using a communication network such as an ISDN network and that before an information channel is established, allows an user to communicate with a database system over a signal channel and designate desired music software.

The database system of this embodiment has: a first information recording medium 51 (a type-1 information recording medium requiring a long access time but offering a large storage capacity, such as, an optical disc); a second information recording medium 52 (a type-2 information recording medium requiring a short access time and offering a relatively large storage capacity, such as, a hard disc); a third information recording medium 53 (a type-3 information recording medium requiring a very short access time but offering a relatively small storage capacity, such as, a RAM or a flash memory); a CPU 54 for executing control programs; a system bus 55 that consists of a data bus, an address bus, and a control bus and over which the CPU 54 is allowed to transmit data, a control program memory 56 that contains control programs and is formed with a ROM; a request frequency memory 57 that contains the numbers of requests made by users in one-to-one correspondence with musical compositions and that is formed with a RAM; a lowest frequency memory 58 that records the number of requests for a musical composition which ranks lowest among those recorded in the third information recording medium 53 and the number of requests of a musical composition which ranks lowest among those recorded in the second information recording medium 52, and that is formed with a RAM; a musical composition listing memory 59 that stores a listing of musical compositions contained in the information recording media 51, 52, and 53; an operation unit 60 for use in setting or modifying the number of requests for a musical composition when the musical composition is copied from the first information recording medium 51 to the second information recording medium 52 or third information recording medium 53, or transcribed between the second information recording medium 52 and the third information recording medium 53; a display unit 61 for displaying a result of an operation achieved using the operation unit 60, accommodation locations associated with musical compositions, and user information; a communication channel 62 that is an information channel for transmitting music software existent in an information recording medium to a user, and a network interface 63 for providing the interface with an ISDN network.

The ISDN network provides users with a signal channel D for use in transferring call control signals at the time of call origination or termination, and an information channel B for use in end-to-end information transmission.

User-to-user information (UUI) usable for transferring information between an user terminal and a database system is included as one information element in each of the call control signals.

The network interface 63 separates or units the signal channel D and information channel B which are provided by an ISDN network. The network interface 63 transfers call control signals to or from the CPU 54 over the channel D, and transfers end-to-end information to or from the communication channel 62 over the channel B.

The CPU 54 executes programs existent in the control program memory 56, and thus transfers call control signals to or from the network interface 63 over the system bus 55. The CPU 54 also controls all the operations of the database system.

Next, initial positioning of music software according to the database system accessing method of this embodiment will be discussed.

(a2) Music software recorded in the first information recording medium 51 is prepared.

(b2) An operator of the database system estimates the numbers of requests made by users for respective music software packages and enters the values at the operation unit 60.

(c2) The entered numbers of requests made by users for the respective music software packages are stored in the request frequency memory 57.

(d2) The operator of the database system operates the operation unit 60 and instructs the CPU 54 to execute initial positioning for music software; that is, gives instructions to the CPU 54 about the numbers of musical compositions to be copied from the first information recording medium 51 to the information recording medium 52 and third information recording medium 53 respectively.

(e2) The CPU 54 executes initial positioning for music software according to the estimated numbers of requests made by users or the estimated orders of the numbers of requests, and stores the listing of musical compositions recorded in the respective information recording media (actually, the listing of musical compositions recorded in the information recording media 52 and 53) in the musical composition listing memory 59.

The CPU 54 records the number of requests for a musical composition, which ranks lowest among those recorded in the third information recording medium 53, and the number of requests for a musical composition, which ranks lowest among those recorded in the second information recording medium 52, in the lowest frequency memory 58.

Figure 8:
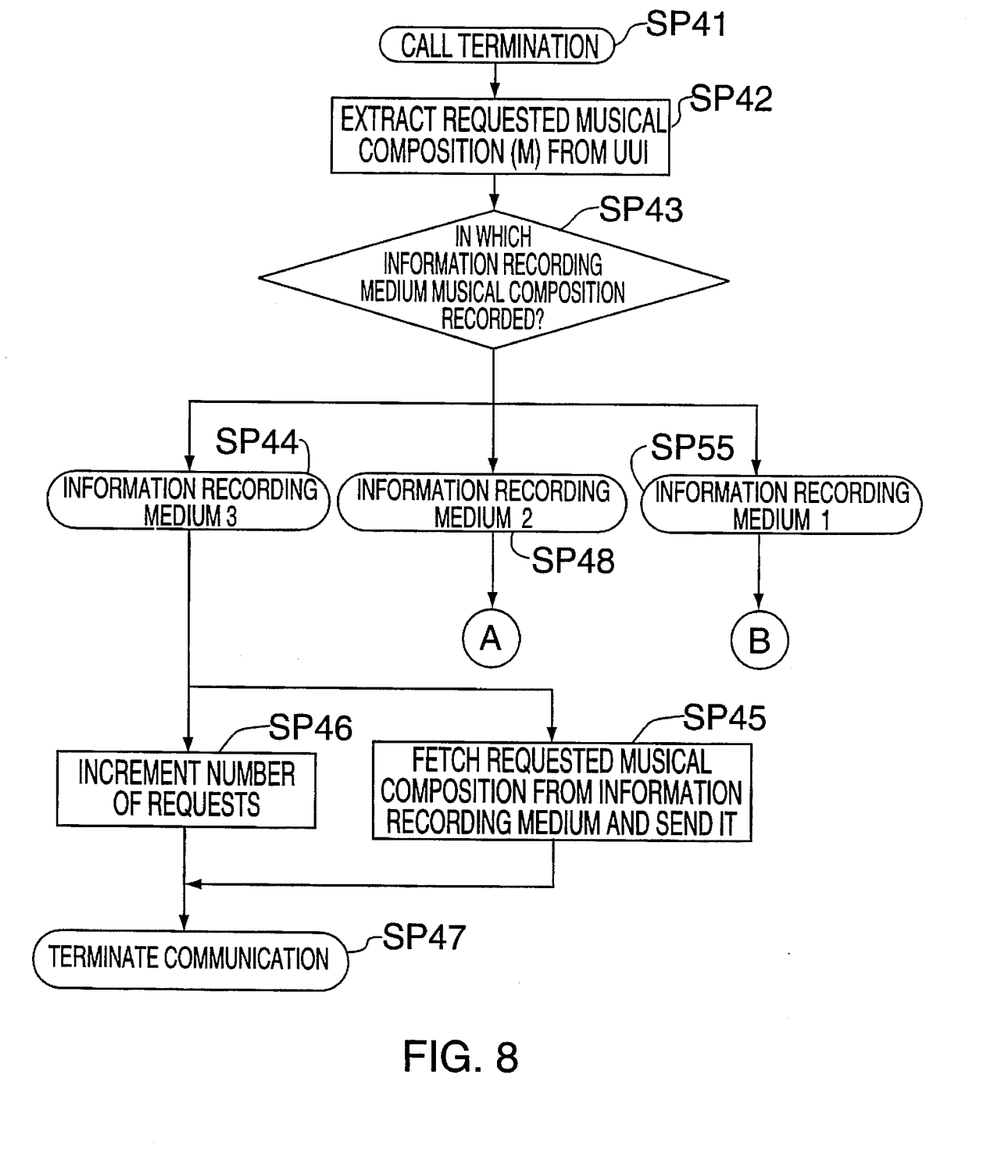
FIG. 8 is a flow chart showing a database system accessing method.

Next, the database system accessing method followed when an user attempts to fetch desired information from a database system will be described with reference to the flow charts shown in FIGS. 8 to 10.

(a3) To begin with, as mentioned in item (e2), the number of requests for a musical composition that ranks lowest among those recorded in the third information recording medium 53 and the number of requests for a musical composition that ranks lowest among those recorded in the second information recording medium 52 are recorded as indicators showing initial positioning of music software. A listing of musical compositions recorded in the information recording media 52 and 53 is stored in the musical composition listing memory 59.

(b3) When a call from an user terminates at a step SP41, the network interface 63 receives a Call Setup message over the channel D of an ISDN network, and transmits the Call Setup message to the CPU 54. When receiving the Call Setup message, the CPU 54 extracts a musical composition requested by the user from the user-to-user information included in the Call Setup message.

(c3) The CPU 54 retrieves the musical composition listing 59 at a step SP43, and determines that, in which information recording medium, the musical composition requested by the user is recorded.

(d3) When the musical composition requested by the user is recorded in the third information recording medium 53, the CPU 54 fetches the requested musical composition from the third information recording medium 53 and transmits it to the ISDN network via the network interface 63 over the communication channel 62 at steps SP44 through SP45. While, at a step SP46, the CPU 54 increments the number of requests for the musical composition requested by the user, which is stored in the request frequency memory 57, by one.

At a step SP47, the CPU 54 transmits a Clear message through the network interface 63 to the ISDN network over the channel D, and releases the communication channel 62 to terminate the communication.

Figure 9:
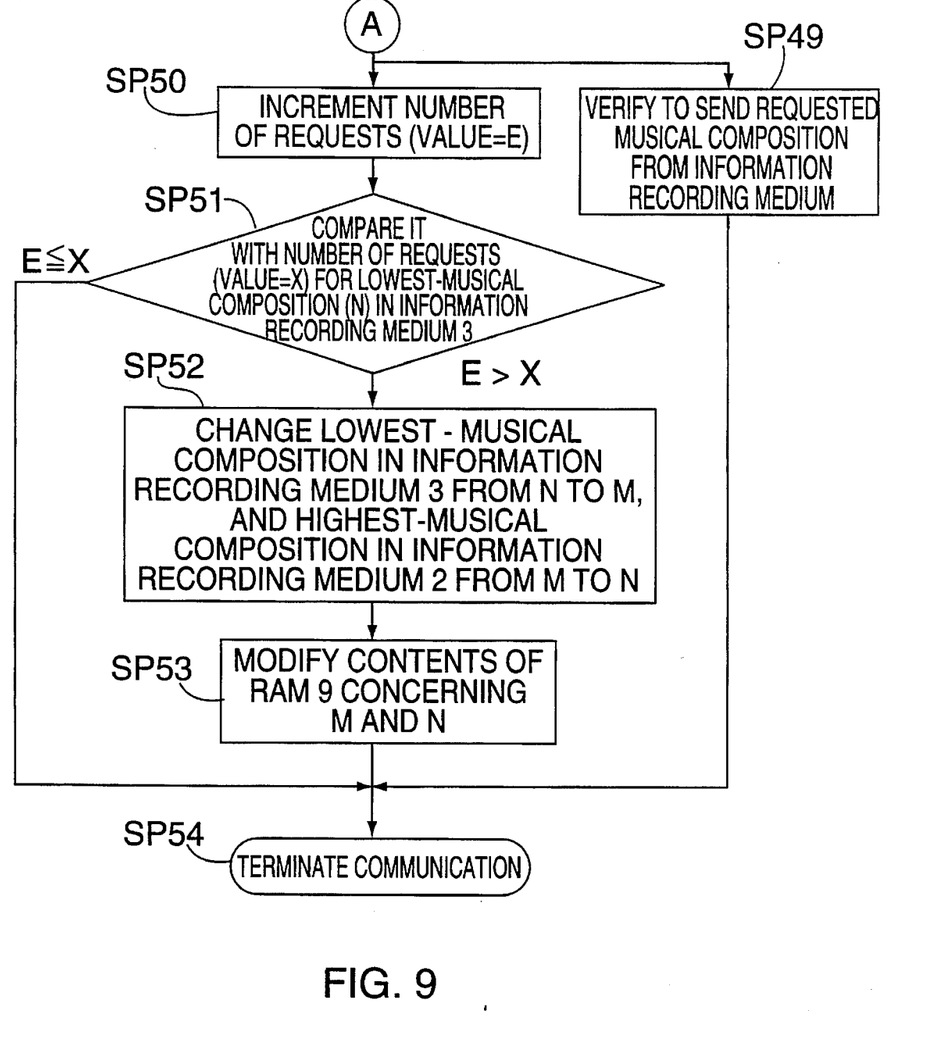
FIG. 9 is a flow chart showing a database system accessing method.
Figure 10:
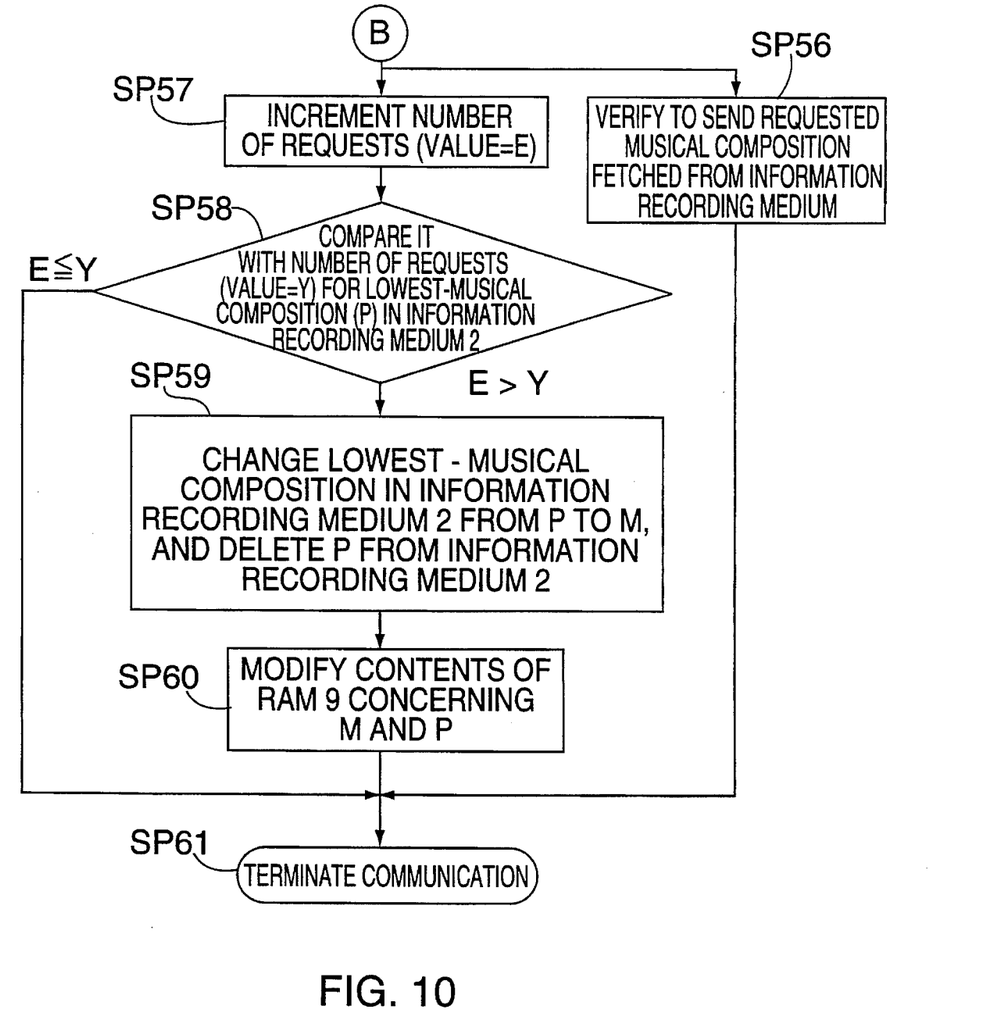
FIG. 10 is a flow chart showing a database system accessing method.

(e2) When the musical composition requested by the user is recorded in the second information recording medium 2, the CPU 54 fetches the requested musical composition from the second information recording medium 52 and transmits it to the ISDN network via the network interface 63 over the communication channel 62 at steps SP48 through SP49 (FIG. 9). While, at a step SP50, the CPU 54 increments the number of requests for the musical composition requested by the user, which is stored in the request frequency memory 57, by one.

After completing the operation at the step SP50, at a step SP51, the CPU 54 compares the number of requests the value of which is for the musical composition the number of which is N requested by the user, which has been incremented by one and stored in the request frequency memory 57, with the number of requests for a musical composition that ranks lowest among those recorded in the third information recording medium 53.

When the former exceeds the latter, at the step SP52, the CPU 54 transcribes the former musical composition from the second information recording medium 52 to the third information recording medium 53, and the latter musical composition from the third information recording medium 53 to the second information recording medium 52. At a step SP53, the listing of musical compositions recorded in the information recording media 51, 52, and 53, which is stored in the musical composition listing memory 59, is modified.

At a step SP54, the CPU 54 transmits a Clear message to the ISDN network through the network interface 63 over the channel D, and releases the communication channel 62 to terminate the communication.

When the result of the comparison done at the step SP51 has revealed that the latter exceeds the former, the processing of the steps SP52 and SP53 are not executed but the CPU 54 proceeds to the step SP54 directly. The communication is then terminated.

(f3) When the musical composition requested by the user is recorded in the first information recording medium 51, the CPU 54 fetches the requested musical composition from the first information recording medium 51 and transmits it to the ISDN network via the network interface 63 over the communication channel 62 at steps SP55 through SP56 (FIG.

10). While, at a step SP57, the CPU 54 increments the number of requests for the musical composition requested by the user, which is stored in the request frequency memory 57, by one.

After completing the operation of the step SP57, at a step SP58, the CPU 54 compares the number of requests the value of which is Y for the musical composition the number of which is P requested by the user, which has been incremented by one and stored in the request frequency memory 57, with the number of requests for a musical composition that ranks lowest among those recorded in the second information recording medium 52, which is stored in the lowest frequency memory 58.

When the former exceeds the latter, at a step SP59, the CPU 54 transcribes the former musical composition from the first information recording medium 51 to the second information recording medium 52, and deletes the latter musical composition from the second information recording medium 52. At a step SP60, the listing of musical compositions recorded in the second recording medium 2, which is stored in the musical composition listing memory 59, is modified.

At a step SP61, the CPU 54 transmits a Clear message to the ISDN network through the network interface 63 over the channel D, and release the communication channel 62 to terminate the communication.

When the result of the comparison done at the step SP58 has revealed that the latter exceeds the former, the processing of the steps SP59 and SP60 is not executed but the CPU 54 proceeds to the step SP61. The communication is then terminated.

The states of records in the information recording media 51, 52, and 53, which vary at every time an user issues a request, can be grasped by displaying the contents of the musical composition listing memory 59 on the display unit 61.

Sources to be recorded in information recording media are not limited to music software but may be motion pictures, news, or newspaper articles including photographs.

The types of information recording media are not limited to the aforesaid ones. The number of types of information recording media may be, needless to say, larger or smaller.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A database accessing method in a database access mode for said communication network, comprising:

a step succeeding a step at which an user terminal transmits a Call Setup message in which access information concerning user's access to a database is specified as user-to-user information, at which a database system receives said Call Setup message and extracts user-to-user information;

a step succeeding said step of extracting said user-to-user information, at which said database system transmits an accessed message in which the fact that said database system has received the access information concerning user's access to a database is specified as user-to-user information;

a step succeeding said step of extracting said user-to-user information, at which said database system interprets said user-to-user information in said Call Setup message, and determines whether the user has the intention of using said database system and the user's personal identification information is valid, and what is the designation of requested information;

a step succeeding said determining step, at which when determining that the set of information sent from the user does not represent a database system use request, the user's personal identification information is invalid, the designation of requested information is inconsistent, or the requested information is unfond, said database system transmits a Clear message;

a step succeeding said determining step, at which when determining that the set of information sent from the user represents a database system use request, the user's personal identification is valid, and the designation of requested information is consistent, said database system transmits an Acknowledge message in which a request for asking the user to stand by in order to receive information is specified as user-to-user information;

a step succeeding said step at which said database system transmits an Accessed message, at which said user terminal receives said Accessed message;

a step succeeding said step of receiving said Accessed message, at which said user terminal determines whether the succeeding message is a Clear message or an Acknowledge message;

a step succeeding said determining step, at which when determining at said determining step that the succeeding message is a Clear message, said user terminal receives and interprets the Clear message;

a step succeeding said determining step, at which when determining at said determining step that the succeeding message is an Acknowledge message, said user terminal receives the Acknowledge message, interprets the user-to-user information, and establishes a communication channel;

a step succeeding said step of establishing the communication channel, at which said database system transmits requested information over said established communication channel;

a step succeeding said step of transmitting information over the communication channel, at which said user terminal receives desired information from said database system;

a step succeeding said step of receiving information, at which said database system transmits a Clear message in which information concerning information sources accommodated by said database system is specified as user-to-user information; and a step succeeding said step of transmitting a Clear message, at which said user terminal receives said Clear message.

2. A database accessing method in a database access mode for a communication network to or from which a Call Setup message, an Accessed message, an Acknowledge message, and a Clear message can be transferred according to a call control procedure, comprising:

a step at which an user terminal transmits a Call Setup message in which access information concerning user's access to a database is specified as user-to-user information;

a step at which a database system receives said Call Setup message and extracts said user-to-user information;

a step at which said database system transmits an Accessed message in which the fact that the database system has received the access information concerning user's access to a database is specified as user-to-user information;

a step at which said database system interprets said user-to-user information in said Call Setup message, and determines whether the user has the intention of using said database system and the user's personal identification information is valid, and what is the designation of requested information;

a step at which when determining that the set of information sent from the user does not represent a database system use request, the user's personal identification information is invalid, the designation of requested information is inconsistent, or the requested information is unfond, said database system transmits a Clear message;

a step at which when determining that the set of information sent from the user represents a database system use request, the user's personal identification information is valid, and the designation of requested information is consistent, said database system transmits an Acknowledge message in which a request for asking the user to stand by in order to receive information is specified as user-to-user information;

a step at which said user terminal determines whether a message succeeding said Accessed message is a Clear message or an Acknowledge message;

a step at which when determining at said determining step that the message is a Clear message, said user terminal receives and interprets the Clear message;

a step at which when determining at said determining step that the message is an Acknowledge message, said user terminal receives the Acknowledge message, interprets the user-to-user information, and establishes a communication channel;

a step at which said database system transmits requested information over said established communication channel;

a step at which said user terminal receives the desired information from said database system;

a step at which said database system transmits a Clear message in which information concerning information sources accommodated by said database system is specified as user-to-user information; and a step at which said user terminal receives said Clear message.

3. A database accessing method according to claim 2, wherein an user's intention of using a database system, user's personal identification information such as an attribute and a subscriber number, and information of a designation of requested information are employed as access information concerning user's access to a database.

4. A database accessing method according to claim 2, wherein after interpreting the user-to-user information in a Call Setup message and determining whether an user has the intention of using said database system and the user's personal information is valid, when finding that a database system use request is not issued or the user's personal identification information is invalid, said database system transmits a Clear message in which the fact that access to said database system is illegal is specified as user-to-user information.

5. A database accessing method according to claim 2, wherein after interpreting the user-to-user information in a Call Setup message and determining what is the designation of requested information for using said database system, when finding that the designation of requested information is inconsistent, said database system transmits a Clear message in which the fact is specified as user-to-user information.

6. A database accessing method according to claim 5, wherein said communication network is conformable to ISDN.

7. A database accessing method according to claim 2, wherein information concerning announcement of new products, access methods for accessing the new products, and a charge list is employed as the information concerning information sources accommodated by said database system that after information requested by an user is transmitted over the communication channel, is specified as user-to-user information in a Clear message.

* * * * *